United States Patent
Higuchi et al.

(10) Patent No.: US 7,285,988 B2
(45) Date of Patent: Oct. 23, 2007

(54) COMPARATOR CIRCUIT WITH OFFSET CONTROL

(75) Inventors: Fujio Higuchi, Yamagata (JP); Yoichi Takahashi, Yamagata (JP); Tomotake Ooba, Yamagata (JP); Akira Saitou, Yamagata (JP); Keiko Kobayashi, Yamagata (JP); Keiichi Iwazumi, Yamagata (JP)

(73) Assignee: NEC Electronics Corporation, Kanagawa (JP)

( * ) Notice: Subject to any disclaimer, the term of this patent is extended or adjusted under 35 U.S.C. 154(b) by 0 days.

(21) Appl. No.: 11/242,020

(22) Filed: Oct. 4, 2005

(65) Prior Publication Data

US 2006/0071693 A1    Apr. 6, 2006

(30) Foreign Application Priority Data

Oct. 5, 2004  (JP)  .............................. 2004/293066

(51) Int. Cl.
  *H03K 5/22* (2006.01)
(52) U.S. Cl. .................. 327/66; 327/563; 330/253; 330/254; 330/257; 330/261
(58) Field of Classification Search ................. 327/65, 327/66, 560–563
See application file for complete search history.

(56) References Cited

U.S. PATENT DOCUMENTS

| 5,334,891 | A | * | 8/1994 | Marbot | 327/281 |
| 5,589,794 | A | * | 12/1996 | McClure | 327/538 |
| 5,793,239 | A | * | 8/1998 | Kovacs et al. | 327/262 |
| 5,999,028 | A | * | 12/1999 | Knoch et al. | 327/165 |
| 6,072,349 | A | * | 6/2000 | Pippin et al. | 327/307 |
| 6,980,051 | B2 | * | 12/2005 | Ryynanen et al. | 330/254 |
| 7,078,968 | B2 | * | 7/2006 | Gaeta et al. | 330/254 |

FOREIGN PATENT DOCUMENTS

| JP | 10-68785 A | 3/1998 |
| JP | 2004-64262 A | 2/2004 |

* cited by examiner

*Primary Examiner*—Tuan T. Lam
*Assistant Examiner*—William Hernandez
(74) *Attorney, Agent, or Firm*—Sughrue Mion Pllc.

(57) ABSTRACT

A semiconductor integrated circuit has:
a differential amplifier circuit including a first MOS transistor connected between a first node and a common node and a second MOS transistor connected between a second node and the common node; a first current supply circuit configured to supply current to the first node; and a second current supply circuit configured to supply current to the second node. A current supply ability of the first current supply circuit is variable.

10 Claims, 11 Drawing Sheets

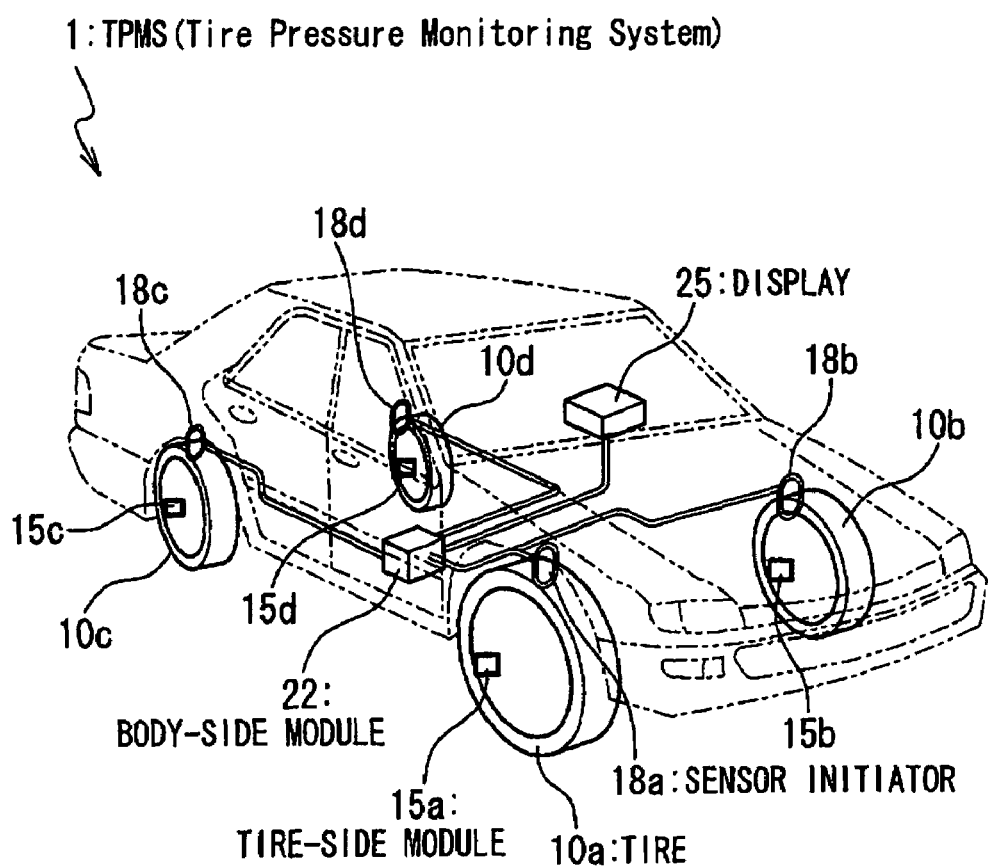

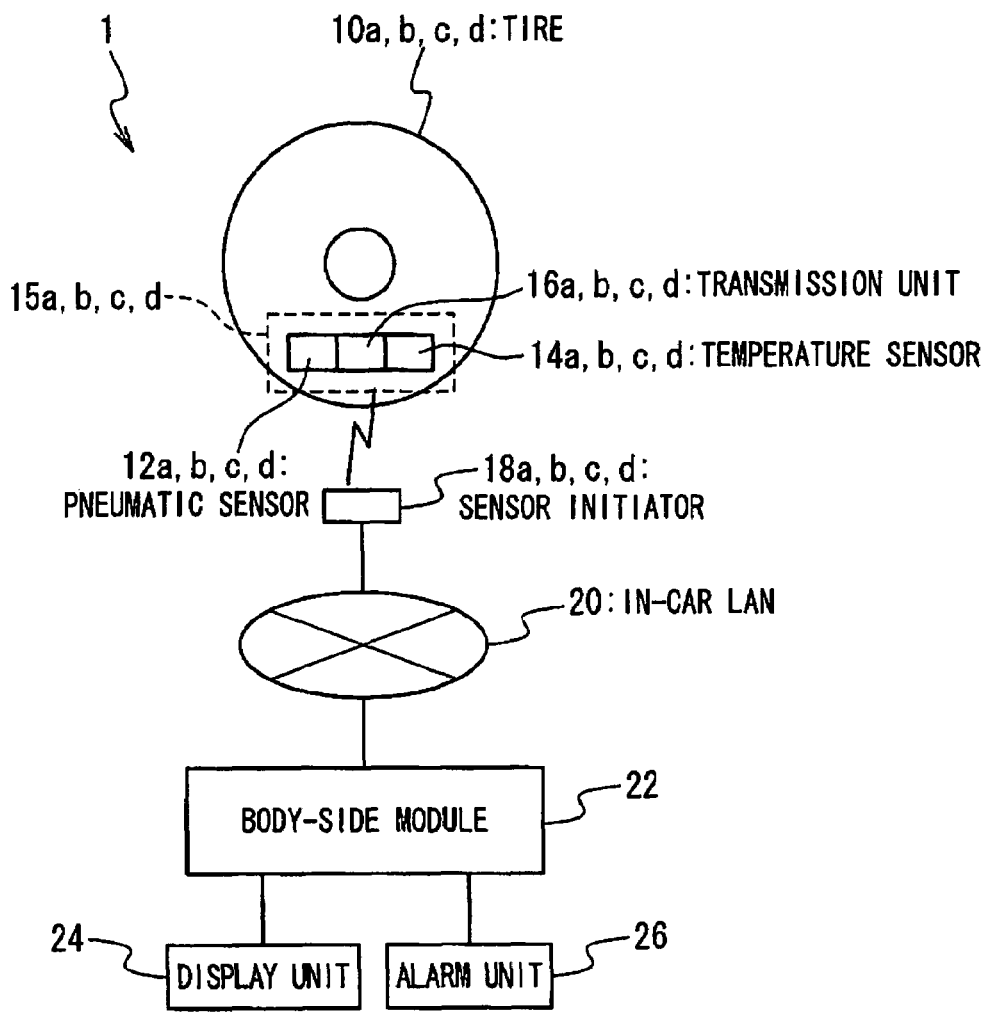
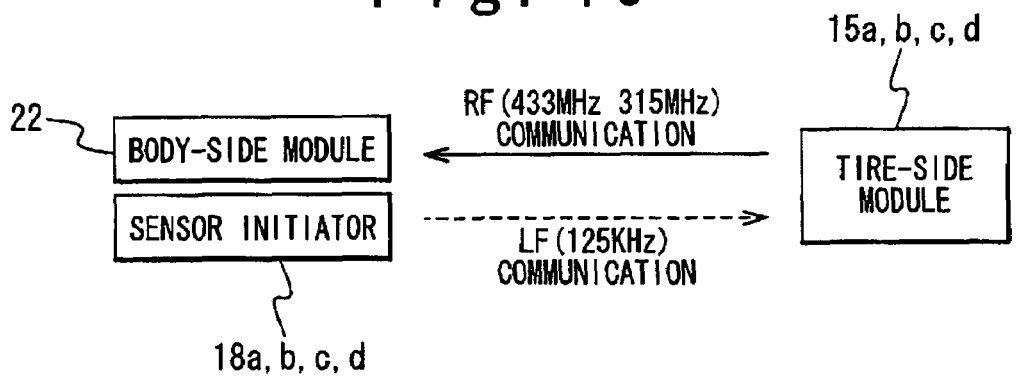

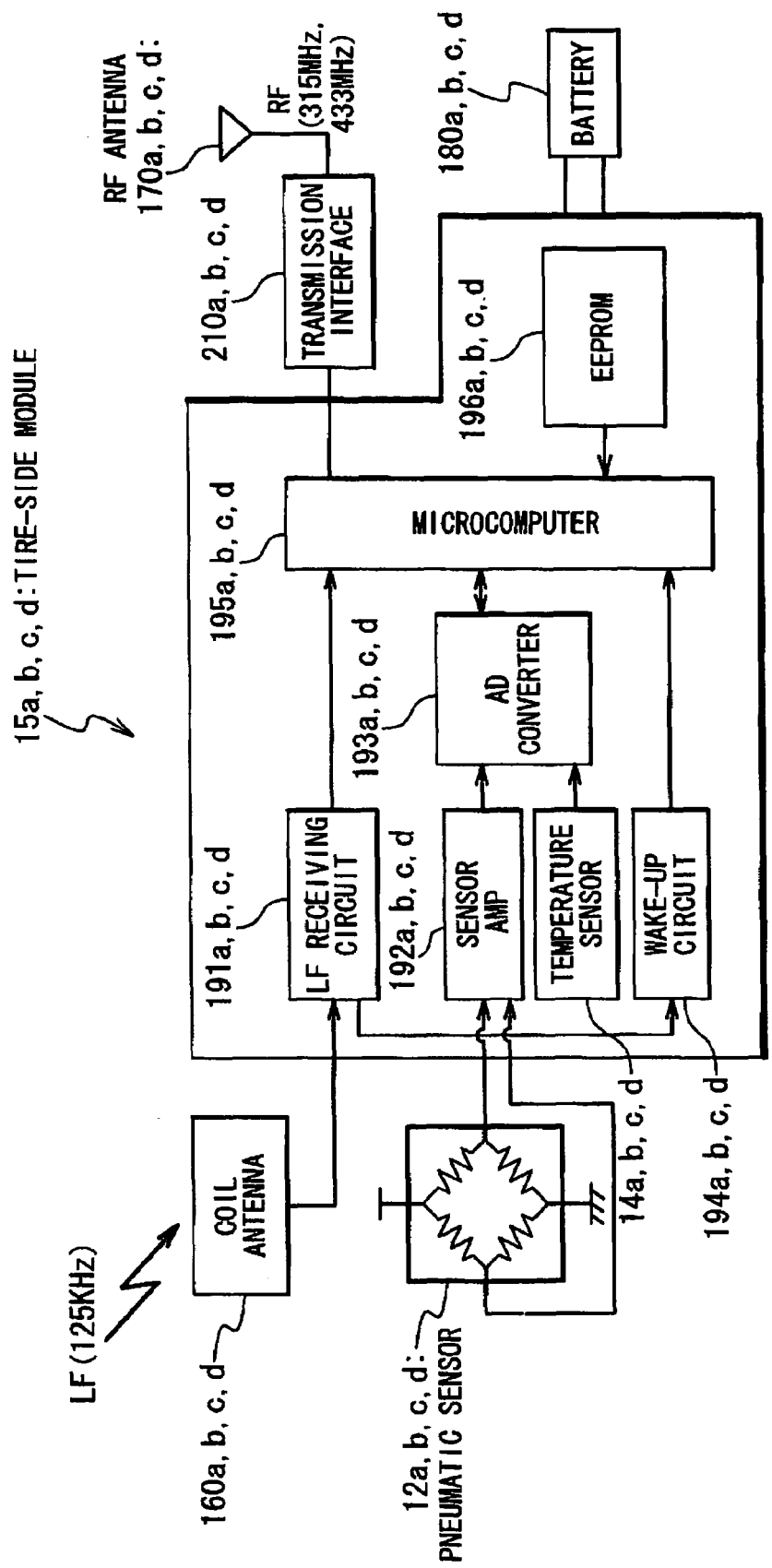

COMPARATOR CIRCUIT WITH OFFSET CONTROL

BACKGROUND OF THE INVENTION

1. Field of the Invention

The present invention relates to a semiconductor integrated circuit and a method of controlling the same. Particularly, the present invention relates to a semiconductor integrated circuit having a differential amplifier circuit consisting of MOS transistors, and a method of controlling the same.

2. Description of the Related Art

In recent years, regulations with regard to safety have been intensified one after the other in Japan and United States. According to the TREAD Act (Transportation Recall Enhancement, Accountability and Document Act) which takes effect in North America, a new car that will be sold on 2006 or later is obligated to carry a vehicle tire pressure monitoring system. Therefore, it is currently considered to provide sensors in tires in order to measure tire pressure and temperature. More specifically, sensor units are mounted on valve sections of respective tires such that all four wheels can be monitored individually. Such a system has the advantages that the monitoring in high precision can be attained and the tire pressure can be monitored even during parking and stopping.

In the tire pressure monitoring system, the tire pressure is measured at regular time intervals, the measured data are transmitted to a body-side via radio waves, and the data are displayed on a display provided in a cockpit. Therefore, the system has a "tire-side module" provided at a tire wheel and a "body-side module" provided in the body side. The "tire-side module" has several kinds of sensors, a receiving unit and a transmission unit. The sensors are used for detecting pressure, temperature and so on. The receiving unit receives a command data which is transmitted from the above-mentioned body-side module through LF (Low Frequency) radio waves. The transmission unit transmits the data obtained by the sensors to the above-mentioned body-side module through RF (Radio Frequency) radio waves.

The command data (command signal) transmitted from the body-side module on the LF radio waves is transmitted in an ASK (Amplitude Shift Keying) format. The tire-side module receives the command signal on the LF radio waves by using an LC resonant antenna, and an input voltage resulting from LC self-excitation resonance is detected by a comparator having a high gain. Sensitivity in the detection is determined by a threshold of the comparator. The threshold is generally referred to as an "offset" of the comparator.

A typical comparator has a differential amplifier circuit. FIG. 1 shows a conventional differential amplifier circuit which has a resistance load RL. In an integrated circuit, two adjacent transistors Tr1 and Tr2 can be manufactured to have substantially the same characteristics. Therefore, influence of drift such as the temperature and the like can be eliminated in a differential amplifier circuit 60 as shown in FIG. 1. Such the differential amplifier circuit 60 is used for receiving the above-mentioned command signal in the ASK format. As shown in FIG. 1, the differential amplifier circuit 60 has a pair of bipolar transistors Tr1 and Tr2 having substantially the same characteristics. Bases of the respective transistors Tr1 and Tr2 serve as input terminals for receiving input voltages Vi1 and Vi2. Collectors of the respective transistors Tr1 and Tr2 serve as output terminals for outputting output voltages Vo1 and Vo2. Also, respective of the collectors are connected to a power supply through resistance loads RL of the same size. Emitters of the respective transistors Tr1 and Tr2 are connected to a common bias power supply. The ratio of the change in the difference between the output voltages (Vo1−Vo2) to the change in the difference between the input voltages (Vi1−Vi2) of the differential amplifier circuit 60 is referred to as a differential gain G, which is represented by the following equation:

$$G=|(Vo1-Vo2)/(Vi1-Vi2)|=gm*RL$$

Here, the RL is the resistance load connected to the collectors of the transistors TR1 and TR2. The gm satisfies the following relation: gm=qIe/2kT. Here, k is a Boltzmann constant, T is an absolute temperature, and q is an elementary charge. Also, Ie is emitter currents of the pair of transistors TR1 and TR2. Thus, the differential gain G is determined in accordance with the resistance load RL and both emitter currents Ie.

In relation to the foregoing technique, Japanese Laid Open Patent application (JP-A 2004-64262) proposes a differential amplifier circuit. The differential amplifier has a pair of bipolar transistors and a pair of loads connected to outputs of the pair of transistors. The pair of loads includes a pair of capacitances, a pair of current sources and a pair of high resistances which are provided in parallel. The pair of capacitances has impedance for determining the gain of the differential amplifier circuit at a predetermined frequency. The pair of current sources is used for canceling a bias current of the differential amplifier circuit. The pair of high resistances determines output bias voltages at the output ends.

Japanese Laid Open Patent Application (JP-A-Heisei 10-68785) discloses a receiving circuit with an antenna. The receiving circuit has an analog amplifier and a filter as shown in FIG. 2. In FIG. 2, the circuit includes an input terminal 20010, an amplifier circuit 20001, an active filter circuit 20002, a crystal filter 20003, an amplifier circuit 20004, and an output terminal 20027. The amplifier circuit 20001 has a capacitance 20011, a CMOS inverter 20012 and a resistance 20013. By increasing the value of the resistance 20013, it is possible to enhance the gain of the amplifier circuit. However, noises of power supply and GND are also amplified at the same time. The amplifier shown in FIG. 2 can not be applied to a circuit sensitive to the noises.

SUMMARY OF THE INVENTION

The present invention has recognized the following points. The differential amplifier circuit 60 shown in FIG. 1 is constituted by the bipolar transistors, which is unsuitable for the integration. Moreover, a process of manufacturing the bipolar transistors is necessary in addition to a process of manufacturing MOS transistors which constitute a logic section. This results in the increase in the cost of manufacturing.

When the differential amplifier circuit 60 is constituted by MOS transistors, characteristics of two input MOS transistors of the differential amplifier circuit differ from each other due to manufacturing variations of the gate pattern and the like, which increases the offset of the comparator. For example, the offset takes a relatively large value of 5 mV. In this case, radio field intensity which is enough to generate the input voltage of not less than 5 mV is necessary in order to detect the radio waves of the ASK signal. Thus, it becomes difficult to receive radio waves from a radio source at long distance.

In order to reduce the offset and to ensure a good sensitivity with using MOS transistors, it may be necessary to increase the gate width (W) and gate length (L) of the MOS transistors TR1 and TR2 such that the manufacturing variations and manufacturing error are absorbed. In this case, however, the size of the MOS transistor becomes large and hence a chip size is increased, which results in the increase of the cost of manufacturing.

It is desired to reduce the offset of a comparator which includes a differential amplifier circuit constituted by MOS transistors.

In a first aspect of the present invention, a semiconductor integrated circuit has: a differential amplifier circuit including a first MOS transistor connected between a first node and a common node and a second MOS transistor connected between a second node and the common node; a first current supply circuit configured to supply current to the first node; and a second current supply circuit configured to supply current to the second node. A current supply ability of the first current supply circuit is variable. On the other hand, a current supply ability of the second current supply circuit is fixed.

The semiconductor integrated circuit further has a shorting circuit. The shorting circuit shorts a gate of the first MOS transistor and a gate of the second MOS transistor when the current supply ability of the first current supply circuit is changed.

The first current supply circuit includes a plurality of current mirror circuits connected to the first node. A number of current mirror circuits of the plurality of current mirror circuits which supply current to the first node is changed in accordance with a control signal. Thus, a current supply ability of the first current supply circuit is variable.

More specifically, the first current supply circuit includes: a plurality of MOS transistors each of whose drain and gate are connected to the first node; and a plurality of switches which are connected between a power supply and sources of respective of the plurality of MOS transistors. One of the plurality of switches is always turned ON, and the plurality of switches other than the one switch are turned ON in order in accordance with control signals. Here, when only the one switch is turned ON, the current supply ability of the first current supply circuit is lower than the current supply ability of the second current supply circuit. When all of the plurality of switches are turned ON, the current supply ability of the first current supply circuit is higher than the current supply ability of the second current supply circuit. It is thus possible to find a status where the current supply ability is substantially the same between the first current supply circuit and the second current supply circuit. In other words, it is possible to set the offset of a comparator as small as possible.

In a second aspect of the present invention, a data communication apparatus is provided. The data communication apparatus has: an antenna configured to generate an input voltage in response to received radio waves; a comparator to which the input voltage is input; and a microcomputer configured to output control signals to the comparator. The comparator has the same configuration as the semiconductor integrated circuit described above. The offset of the comparator can be controlled in accordance with the control signals output from the microcomputer. Such a data communication apparatus is preferably applied to a TPMS (Tire Pressure Monitoring System).

In a third aspect of the present invention, a method of trimming sensitivity of a comparator is provided. The comparator has: a differential amplifier circuit including a first MOS transistor connected between a first node and a common node and a second MOS transistor connected between a second node and the common node; a first current supply circuit configured to supply current to the first node; and a second current supply circuit configured to supply current to the second node. The method includes: (A) shorting a gate of the first MOS transistor and a gate of the second MOS transistor; (B) fixing a current supply ability of the second current supply circuit; and (C) changing a current supply ability of the first current supply circuit monotonically until an output of the comparator is inverted.

As described above, the differential amplifier circuit and the comparator according to the present invention are constituted by MOS transistors. Therefore, the cost of manufacturing is reduced. Moreover, it is not necessary to make the MOS transistor larger for the purpose of reducing the offset of the comparator, which also contributes to the reduction of the cost.

The comparator according to the present invention is equipped with a circuit for adjusting the offset and trimming the sensitivity. It is possible to set the offset of the comparator as small as possible and hence to improve the sensitivity. Even though the comparator is constituted by MOS transistors, it is possible to reduce the offset without increasing the cost of manufacturing. Since the sensitivity of the comparator is improved, it becomes easy to receive radio waves from a radio source at long distance.

BRIEF DESCRIPTION OF THE DRAWINGS

The above and other objects, advantages and features of the present invention will be more apparent from the following description taken in conjunction with the accompanying drawings, in which:

FIG. 3 is a schematic diagram showing a configuration of a TPMS (Tire Pressure Monitoring System) according to an embodiment of the present invention;

FIG. 4B is a block diagram showing the TPMS (Tire Pressure Monitoring System) according to the embodiment of the present invention;

FIG. 4C is a block diagram showing wireless communication paths in the TPMS (Tire Pressure Monitoring System) according to the embodiment of the present invention;

FIG. 5 is a block diagram showing a configuration of a tire-side module according to the embodiment of the present invention;

DESCRIPTION OF THE PREFERRED EMBODIMENTS

Figure 1:
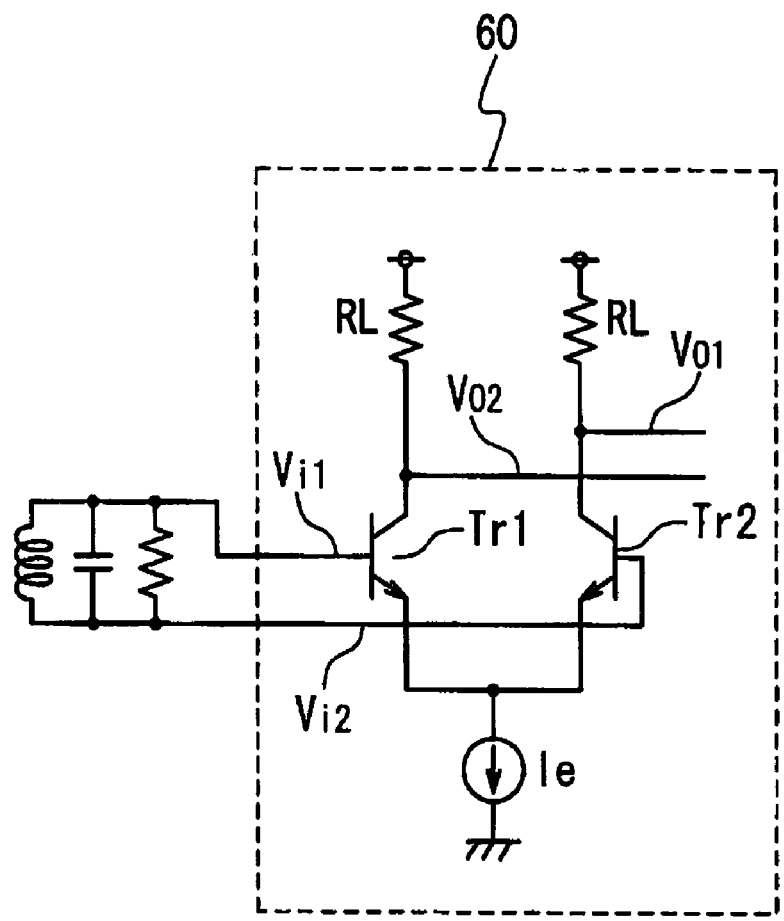
FIG. 1 is a circuit diagram showing a conventional differential amplifier circuit.
Figure 2:
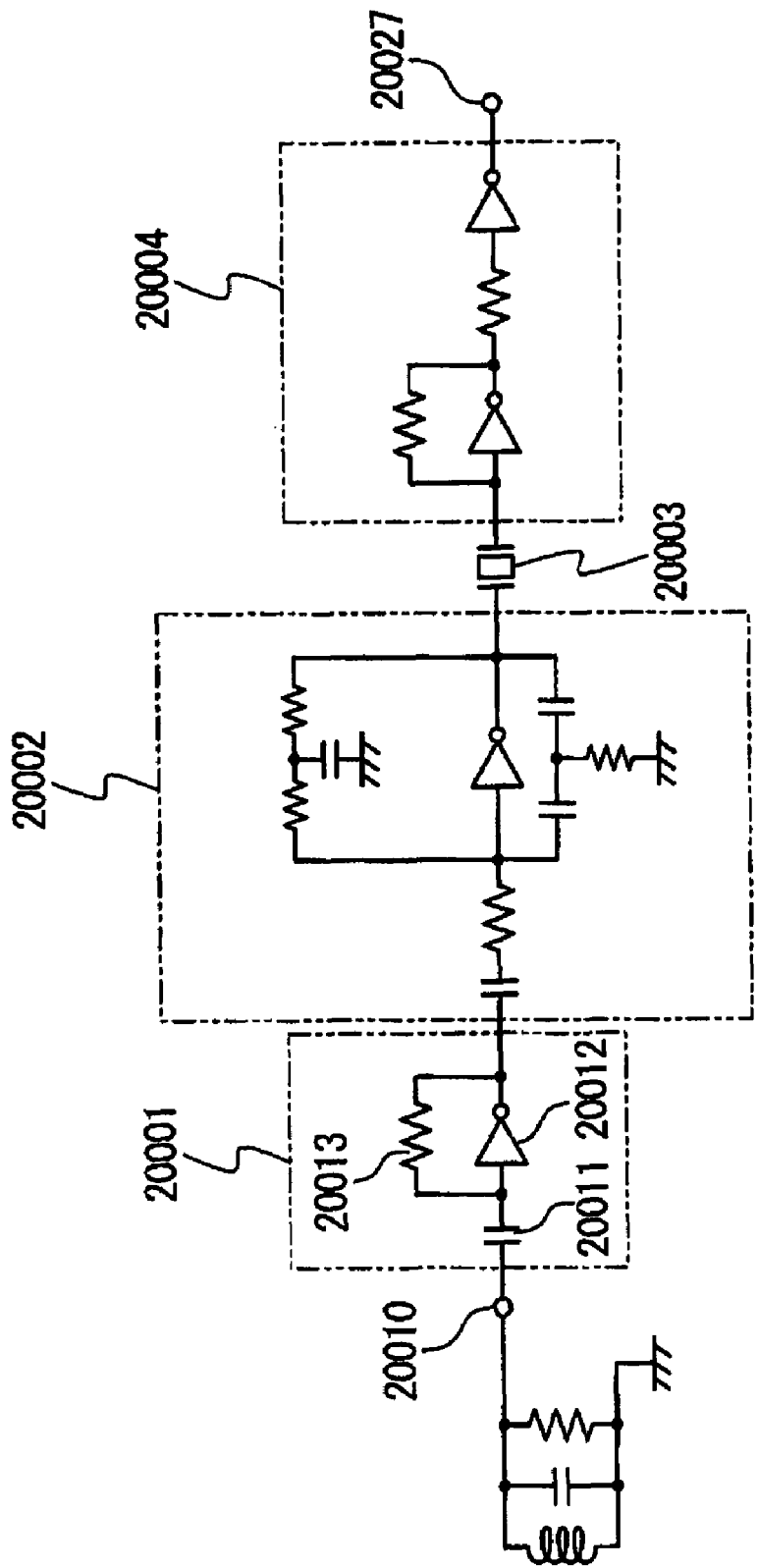
FIG. 2 is a circuit diagram showing a conventional analog amplifier circuit constituted by MOS transistors.

The invention will be now described herein with reference to illustrative embodiments. Those skilled in the art will recognize that many alternative embodiments can be accomplished using the teachings of the present invention and that the invention is not limited to the embodiments illustrated for explanatory purposed.

A comparator (semiconductor integrated circuit) according to the present invention includes a "sensitivity trimming circuit" which is capable of trimming sensitivity of the comparator. The sensitivity trimming circuit may be referred to as an "offset control circuit" in an embodiment. The comparator according to the present invention is preferably mounted on a data communication apparatus of a TPMS (Tire Pressure Monitoring System). The data communication apparatus is, for example, a "tire-side module" of the TPMS. FIG. 3 shows a schematic configuration of the TPMS according to an embodiment of the present invention.

With reference to FIG. 3, a TPMS 1 includes tire-side modules 15a to 15d, sensor initiators 18a to 18d, a body-side module 22 and a display 25. The tire-side modules 15a to 15d are installed in tires 10a to 10d, respectively. The sensor initiators 18a to 18d are on a body-side and provided for respective of the tire-side modules 15a to 15d. The body-side module 22 and the display 25 are mounted on the body of a car.

Each of the tire-side modules 15a to 15d includes several kinds of sensors, a transmission unit and a receiving unit. The sensors are used for detecting tire pressure, temperature and so on. The transmission unit transmits data signals indicative of measurement information obtained by the sensors to the body-side module 22 through RF (Radio Frequency) radio waves. The receiving unit receives command signals transmitted from the body-side module 22 through LF (Low Frequency) radio waves. The body-side module 22 receives the data signals transmitted from the tire-side modules 15a to 15d through the sensor initiators 18a to 18d, respectively. In addition, the body-side module 22 has a function capable of directly receiving RF radio waves which are transmitted based on a "Key Less Entry" system.

Figure 4A:
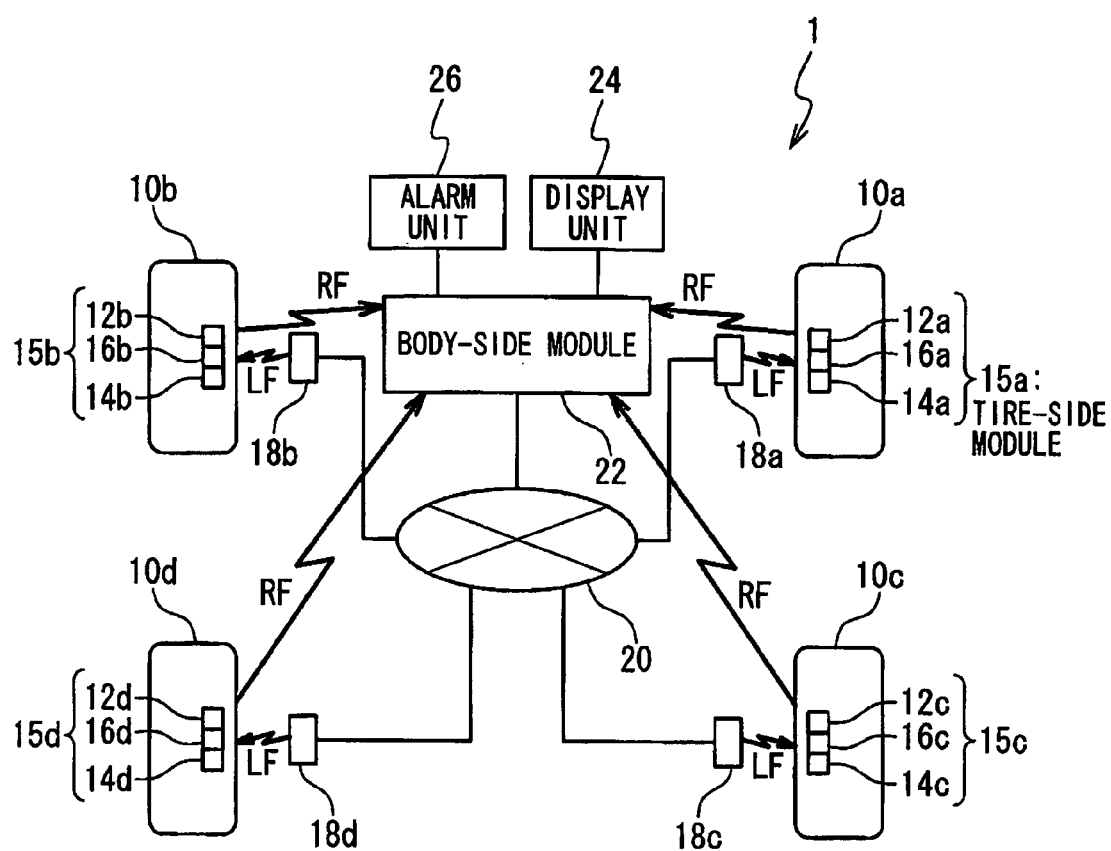
FIG. 4A is a block diagram showing the configuration of the TPMS (Tire Pressure Monitoring System) according to the embodiment of the present invention.

FIGS. 4A and 4B are block diagrams showing the configuration of the TPMS 1 according to the present embodiment. FIG. 4C shows wireless communication paths in the TPMS 1 according to the present embodiment.

With reference to FIGS. 4A to 4C, the tire-side modules 15a to 15d of the TPMS 1 according to the present embodiment are basically installed in respective of the all tires 10a to 10d. The tire-side modules 15a to 15d include pneumatic sensors 12a to 12d, temperature sensors 14a to 14d, and transmission units 16a to 16d, respectively. Each of the transmission units 16a to 16d transmits the measurement data obtained by the above-mentioned sensors to the body-side module 22 through the RF radio wave.

When a driver gets into a car, the driver transmits the Key Less Entry RF radio waves to the body-side module 22. When the body-side module 22 receives the Key Less Entry RF radio waves, the body-side module 22 transmits command signals through an in-car LAN 20 and the sensor initiators 18a to 18d to the tire-side modules 15a to 15d, respectively. The command signals are signals for activating respective tire-side modules 15a to 15d and are transmitted on LF (125 KHz) radio waves. Immediately after the tire-side modules 15a to 15d are activated by the command signals, the tire pressures and temperatures are measured by the various sensors. The measured data (data signals) are transmitted on the RF (433 MHz, 315 MHz) radio waves from the transmission units 16a to 16d to the body-side module 22 mounted on the body side. On the basis of the received data signals, the body-side module 22 notifies the driver the tire pressures and temperatures by using a display unit 24 such as the display 25 and an alarm unit 26.

When the car starts running, the running of the car is detected by a motion SW (not shown) mounted in the tire. The data signals indicative of the tire pressures and temperatures obtained by the pneumatic sensors 12a to 12d and temperature sensors 14a to 14d are transmitted on the RF radio waves from the transmission units 16a to 16d of the tire-side modules 15a to 15d to the body-side module 22, respectively. Here, the data signals may be transmitted at a specific time interval or every time the change in the tire pressure goes over a specified value. On the basis of the received data signals, the body-side module 22 notifies the driver the tire pressures and temperatures by using the display unit 24 and the alarm unit 26.

FIG. 5 is a block diagram showing a configuration of the tire-side modules 15a to 15d. Respective of the tire-side modules 15a to 15d include: coil antennas 160a to 160d and LF receiving circuits 191a to 191d for receiving the LF radio waves of the command signals transmitted from the body-side module 22 through the in-car LAN 20 and the sensor initiators 18a to 18d; RF antennas 170a to 170d and transmission interfaces 210a to 210d for transmitting the RF radio waves of the data signals to the body-side module 22 mounted in the car body; the temperature sensors 14a to 14d; the pneumatic sensors 12a to 12d; sensor AMPs 192a to 192d for amplifying output signals from the pneumatic sensors 12a to 12d; wake-up circuits 194a to 194d; AD converters 193a to 193d; microcomputers 195a to 195d; EEPROMs 196a to 196d for storing tire position data and various correction data; and batteries 180a to 180d.

First, the LF radio waves of the command signals are transmitted from the above-mentioned body-side module 22 through the in-car LAN 20 and the sensor initiators 18a to 18d. Then, the LF radio waves are received by the coil antennas 160a to 160d of the tire-side modules 15a to 15d and input to the LF receiving circuits 191a to 191d, respectively. The command signals are processed in the LF receiving circuits 191a to 191d and are input to the microcomputers 195a to 195d, respectively. In accordance with the processed command signals, the microcomputers 195a to 195d output control signals (not shown) to the temperature sensors 14a to 14d and the pneumatic sensors 12a to 12d. The temperature sensors 14a to 14d and the pneumatic sensors 12a to 12d start the measuring in response to the command signals. The data signals regarding the tire pressures and temperatures obtained by the temperature sensors 14a to 14d and the pneumatic sensors 12a to 12d are input through the sensor AMPs 192a to 192d or directly to the AD converters 193a to 193d, respectively. After that, the data signals are processed by the AD converters 193a to 193d and then input to the microcomputers 195a to 195d, respectively. The data with regard to the tire pressures and temperatures input to the microcomputers 195a to 195d are corrected by using the correction values stored in the EEPROMs 196a to 196d. The corrected data signals are transmitted as the data signals through the transmission interfaces 210a to 210d and the RF antennas 170a to 170d to the body-side module 22 on the RF radio waves.

Usually, in the tire-side modules 15a to 15d, only the wake-up circuits 194a to 194d are constantly in the activated state in order to suppress electric power consumption. Respective of the wake-up circuits 194a to 194d have functions of activating the microcomputers 195a to 195d in response to the LF radio waves of the command signals. The electric powers consumed by the tire-side modules 15a to 15d are supplied from the batteries 180a to 180d connected to the tire-side modules 15a to 15d.

Figure 6:
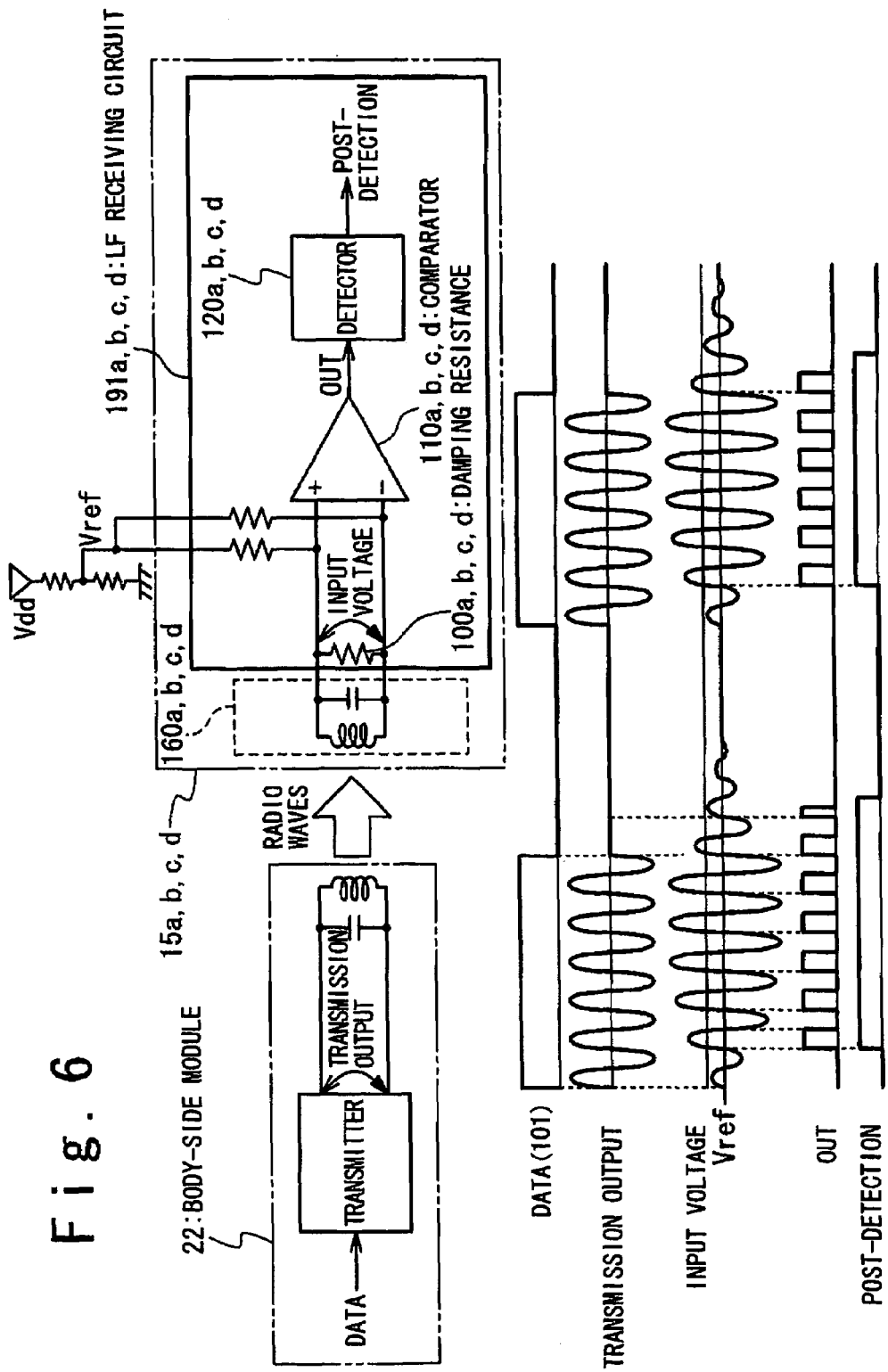
FIG. 6 is a view showing a transmission output waveform of data, and an input voltage waveform when the data is received by an LF receiving circuit of the tire-side module according to the embodiment of the present invention.

FIG. 6 shows a waveform of transmission output of the body-side module 22 and a waveform of input voltage generated in the tire-side modules 15a to 15d. The transmission output corresponds to the command signal in PSK (Phase Shift Key) format which is transmitted on the LF radio waves from the body-side module 22 through the in-car LAN 20 and the sensor initiators 18a to 18d. The input voltage is generated in the tire-side modules 15a to 15d in response to the received LF radio waves of the command signal.

More specifically, the LF radio waves of the command signals (indicated by "DATA" in FIG. 6) are received by the LC resonance coil antennas (resonant antennas) 160a to 160d of the tire-side modules 15a to 15d, as shown in FIG. 6. When the coil antennas 160a to 160d receive the LF radio waves, sinusoidal input voltages are generated between outputs of respective of the coil antennas 160a to 160d. The amplitudes of the input voltages are properly attenuated due to damping resistances 100a to 100d connected to the outputs of the coil antennas 160a to 160d. Then, the command signals (input voltages) are input to comparators 110a to 110d connected to the damping resistances 100a to 100d, respectively. The command signals input to the comparators 110a to 110d are differentially amplified, and rectangular waves corresponding to the input voltages are generated and output from the comparators 110a to 110d as indicated by "OUT" in FIG. 6. Detectors 120a to 120d are connected to the comparators 110a to 110d, respectively. The command signals processed in the comparator 110a to 110d are input to the detectors 120a to 120d and demodulated by the detectors 120a to 120d. As a result of the demodulation, a waveform corresponding to the command signal in the PSK format transmitted from the body-side module 22 is obtained as indicated by "POST-DETECTION" in FIG. 6. The demodulated command signals in the PSK format are input to the microcomputers 195a to 195d connected to the detectors 120a to 120d.

In the comparator 110a to 110d, the input voltage of the input command signal is compared with a sum of a reference potential (Vref) and an "offset value". As indicated by the input voltage and the output waveform (OUT) in FIG. 6, the output signal OUT shifts from "L" to "H" when the input voltage becomes larger than the sum, while the output signal OUT shifts from "H" to "L" when the input voltage becomes smaller than the sum. In this way, the comparators 110a to 110d generate the output signals OUT. If the input voltage of the command signal input to the comparators 110a to 110d is smaller than the sum of the reference potential Vref and the offset value, the command signal can not be detected. Thus, in order that the comparators 110a to 110d and the detector 120a to 120d can detect the command signals correctly, the input voltages of the command signals input to the comparators 110a to 110d are required to be larger than the sum. As the offset value becomes larger, it becomes more difficult to detect the command signals. In order to receive weak radio waves, it is necessary to use the data communication apparatus having the comparator with small offset value.

Figure 7:
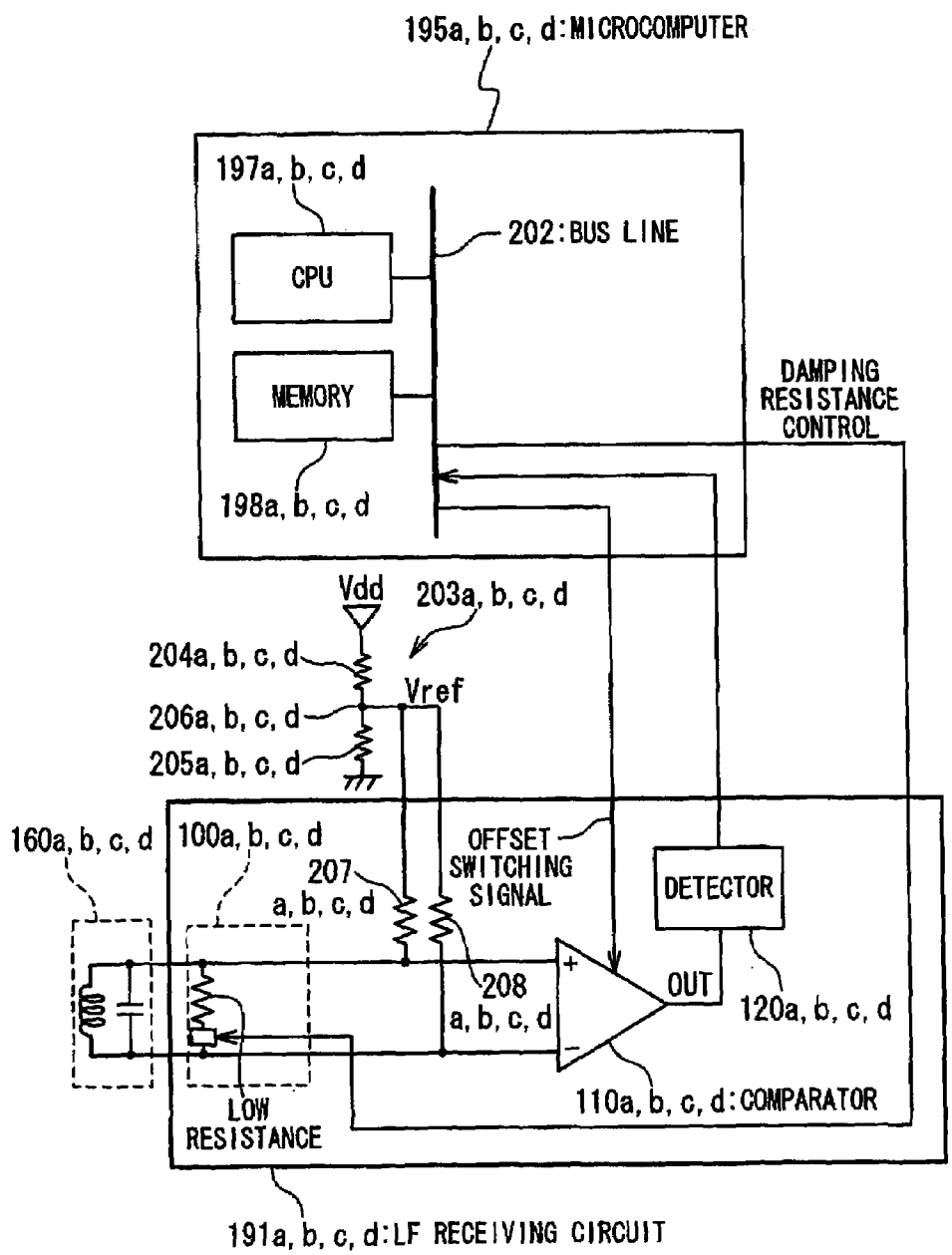
FIG. 7 is a circuit block diagram showing a part of the tire-side module having a comparator according to the embodiment of the present invention.

Next, a comparator having an offset control circuit according to the present embodiment and the tire-side module having the comparator will be described below in detail. FIG. 7 is a block diagram showing the tire-side modules 15a to 15d including the comparator which is equipped with the offset control circuit according to the present embodiment.

Respective of the tire-side modules 15a to 15d according to the present embodiment include: the coil antennas 160a to 160d for receiving the LF radio waves of the command signals transmitted through the in-car LAN 20 and the sensor initiators 18a to 18d from the body-side module 22; the damping resistances 100a to 100d connected to the coil antennas 160a to 160d; the comparators 110a to 110d connected to the damping resistances 100a to 100d; the detectors 120a to 120d connected to the comparators 110a to 110d; the microcomputers 195a to 195d connected to the detectors 120a to 120d; and reference potential generating circuits 203a to 203d. Respective of the reference potential generating circuits 203a to 203d include resistors 204a to 204d and resistors 205a to 205d. Respective of the resistors 204a to 204d and respective of the resistors 205a to 205d are connected in series between a power supply terminal and a ground terminal. The reference potential Vref is generated at each of connection nodes 206a to 206d between the resistors 204a to 204d and the resistors 205a to 205d. The reference potential Vref is supplied to the LF receiving circuits 191a to 191d. More specifically, the connection nodes 206a to 206d are connected through resistors 207a to 207d to first input terminals (+) of the comparators 110a to 110d of the LF receiving circuits 191a to 191d, respectively. Also, the connection nodes 206a to 206d are connected through resistors 208a to 208d to second input terminals (−) of the comparators 110a to 110d of the LF receiving circuits 191a to 191d, respectively. The microcomputers 195a to 195d have CPUs 197a to 197d and memories 198a to 198d, respectively. The memories 198a to 198d are connected through bus lines 202 to the CPUs 197a to 197d, respectively. Respective of the microcomputers 195a to 195d transmit to the comparators 110a to 110d "offset switching signals (control signals)" for controlling the offset values of the comparators 110a to 110d.

The command signals in the PSK format are transmitted on the LF radio waves from the body-side module 22 through the in-car LAN 20 and the sensor initiators 18a to 18d to the tire-side modules 15a to 15d, respectively. When the coil antennas 160a to 160d of the tire-side modules 15a to 15d receive the LF radio waves, the input voltages are generated between the outputs of respective of the coil antennas 160a to 160d. With regard to the damping resistances 100a to 100d connected to the coil antennas 160a to 160d, resistances are selected on the basis of intensity of the LF radio waves input to the coil antennas 160a to 160d. Then, the command signals whose input voltages are controlled by the damping resistances 100a to 100d are input to the microcomputers 195a to 195d through the comparators 110a to 110d connected to the damping resistances 100a to 100d and the detectors 120a to 120d, respectively. When the offsets of the comparators 110a to 110d are controlled by the offset control circuits of the comparators 110a to 110d, i.e, when the trimming of the offsets are executed, the microcomputers 195a to 195d output damping resistance switching signals to switches of damping resistances 100a to 100d, respectively. As a result, an extremely low resistance (R1) is connected between the inputs of each of the comparators 110a to 110d, which shorts between the inputs.

Offset control programs used for controlling the offsets are stored in the memories 198a to 198d of the microcomputers 195a to 195d, respectively. When command signals are input to the microcomputers 195a to 195d, the CPUs 197a to 197d are activated, and the offset control programs are executed by the CPUs 197a to 197d. When the offset control programs are executed, the CPUs 197a to 197d transmit the offset switching signals to the offset control circuits of the comparators 110a to 110d in order to minimize the offset values of the comparators 110a to 110d.

Figure 8:
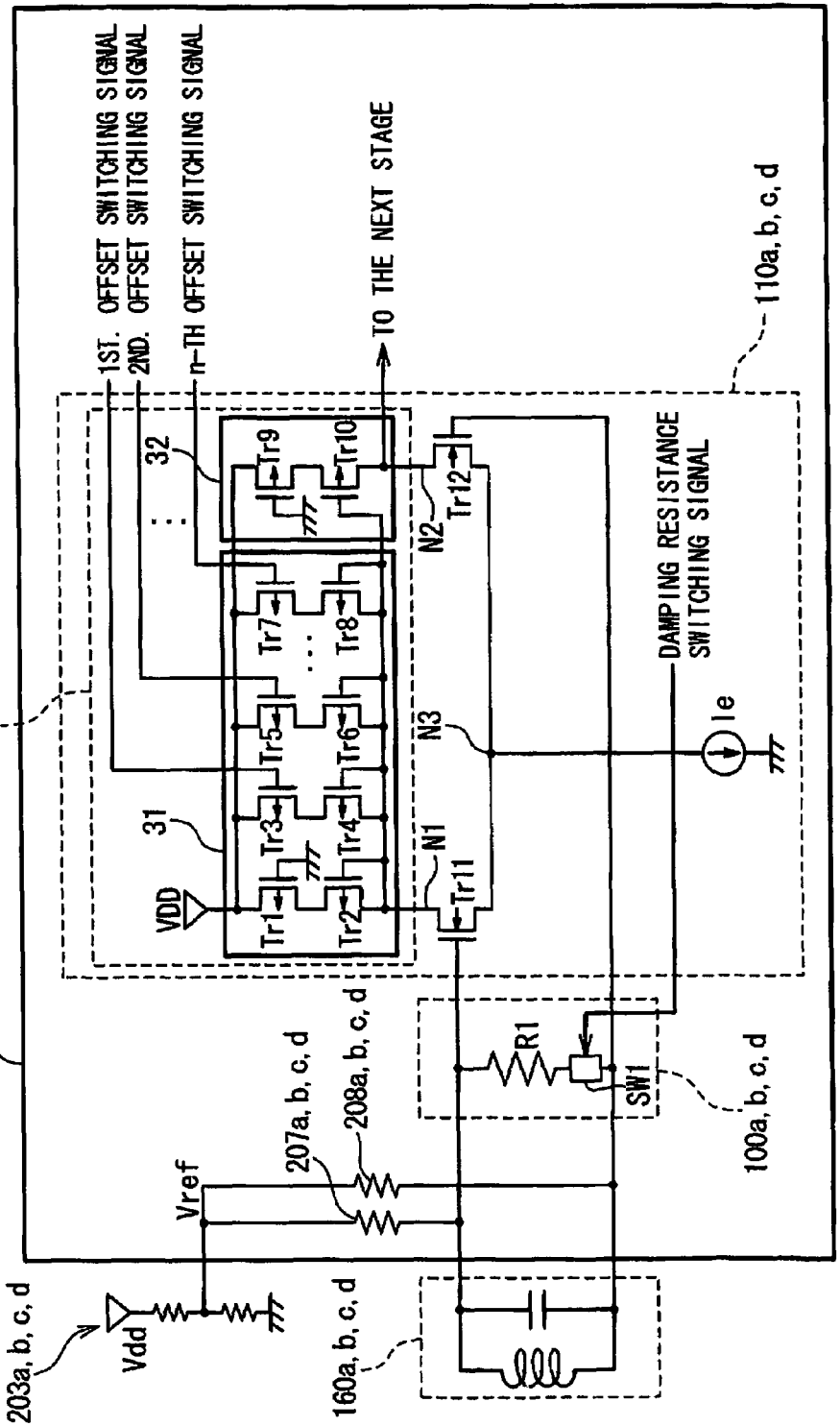
FIG. 8 is a circuit diagram showing a configuration of an LF receiving circuit having an offset control circuit according to the embodiment of the present invention.

FIG. 8 is a circuit diagram showing the LF receiving circuits 191a to 191d in detail. A detailed configuration of each of the comparators 110a to 110d is shown in FIG. 8.

The comparators 110a to 110d have differential amplifier circuits and the offset control circuits 115a to 115d, respectively. Each differential amplifier circuit includes a first MOS transistor Tr11 and a second MOS transistor Tr12. The first MOS transistor Tr11 is connected between a first node N1 and a common node N3, while the second MOS transistor Tr12 is connected between a second node N2 and the common node N3. A gate of the first MOS transistor Tr11 is connected to one input of the comparator 110, while a gate of the second MOS transistor Tr12 is connected to the other input of the comparator 110. Sources of the first and the second MOS transistors Tr11 and Tr12 are connected to a current supply through the common node N3. Drains of the first and the second MOS transistors Tr11 and Tr12 are connected to the first and the second nodes N1 and N2, respectively. The first MOS transistor Tr11 and the second MOS transistor Tr12 configure a differential pair.

Each of the offset control circuits 115a to 115d according to the present embodiment is inserted between power supply VDD and the first, second nodes N1, N2. Each of the offset control circuits 115a to 115d has a function of adjusting the balance between a first current input to the first MOS transistor Tr11 and a second current input to the second MOS transistor Tr12. Generally, in a comparator composed of two transistors, if input currents to the two transistors are the same, the offset value of the comparator is zero. However, when the comparator is composed of two micro MOS transistors, manufacturing error causes unbalance between the input currents to the two MOS transistors, which induces a relatively large offset (about ±5 mV). According to the present embodiment, the comparators 110a to 110d have the offset control circuits 115a to 115d. The microcomputers 195a to 195d transmit the control signals (offset switching signals) to the offset control circuits 115a to 115d, respectively. By the control signals, the input currents to the MOS transistors Tr11 and Tr12 are controlled and adjusted such that the offset values of the comparators 110a to 110d are minimized.

When the input currents to the MOS transistors Tr11 and Tr12 are controlled and adjusted, the same voltage should be applied to the gates of the MOS transistors Tr11 and Tr12. In other words, a difference in input potentials between two inputs of the comparator 110 should be set small as possible. The low resistance R1, whose resistance value is extremely small, is provided in the damping resistance 100 between the two inputs of the comparator 110. More specifically, the low resistance R1 and a switch Sw1 are series-connected between the gates of the first and the second MOS transistors Tr11 and Tr12. When the offset values are controlled, a damping resistance switching signal is supplied from the microcomputer to the switch SW1. In response to the damping resistance switching signal, the switch SW1 electrically connect the low resistance R1 between the gates of the MOS transistors Tr11 and Tr12. As a result, the gates of the MOS transistors Tr11 and Tr12 are shorted. The low resistance R1 and the switch SW1 configure a shorting circuit which shorts the gates of the MOS transistors Tr11 and Tr12 at the time of the offset trimming.

Referring to FIG. 8, the offset control circuits 115a to 115d according to the present embodiment will be described below in detail.

Each of the offset control circuits 115a to 115d has a first current supply circuit 31 and a second current supply circuit 32. The first current supply circuit 31 is connected between the power supply VDD and the first node N1. The first current supply circuit 31 supplies the first current to the first node N1, namely, the first MOS transistor Tr11. On the other hand, the second current supply circuit 32 is connected between the power supply VDD and the second node N2. The second current supply circuit 32 supplies the second current to the second node N2, namely, the second MOS transistor Tr12. In the present embodiment, a current supply ability of the first current supply circuit 31 is variable, i.e., the first current flowing through the first MOS transistor Tr11 is variable. On the other hand, a current supply ability of the second current supply circuit 32 is fixed, i.e., the second current flowing through the second MOS transistor Tr12 is fixed. By changing the current supply ability of the first current supply circuit 31, it is possible to balance between the first current and the second current and hence to minimize the offset of the comparator 110.

The first current supply circuit 31 includes MOS transistors Tr1, Tr3, Tr5, Tr7, Tr2, Tr4, Tr6, and Tr8. The first node N1 is connected with both a drain and a gate of each of the MOS transistors Tr2, Tr4, Tr6 and Tr8. In other words, the first current supply circuit 31 includes a plurality of current mirror circuits connected to the first node N1. The MOS transistors Tr1, Tr3, Tr5 and Tr7 are provided between the power supply VDD and the MOS transistors Tr2, Tr4, Tr6 and Tr8, respectively. Namely, the MOS transistors Tr1, Tr3, Tr5 and Tr7 are connected between the power supply VDD and sources of respective of the MOS transistors Tr2, Tr4, Tr6 and Tr8. These MOS transistors Tr1, Tr3, Tr5 and Tr7 serve as "switches" between the power supply VDD and the first node N1. The above-mentioned offset switching signals are supplied for turning ON and OFF the switches. For example, the first offset switching signal is supplied to the gate of the MOS transistor Tr3, and the MOS transistor Tr3 is turned ON and OFF in accordance with the first offset switching signal. Similarly, the MOS transistors Tr5 and Tr7 are turned ON and OFF in accordance with the second and the n-th offset switching signals, respectively. It should be noted that the MOS transistor Tr1 is always turned ON and the MOS transistor Tr2 always supplies current to the node N1. By switching the MOS transistors Tr3, Tr5 and Tr7, it is possible to change the number of the MOS transistors Tr2, Tr4 and Tr6 which supply current to the first node N1. In other words, the number of the plurality of current mirror circuits which supply current to the first node N1 can be changed in accordance with the offset switching signals (control signals). It is thus possible to change the current supply ability of the first current supply circuit 31, namely, the first current supplied to the first MOS transistor Tr11 in accordance with the offset switching signals.

The second current supply circuit 32 includes a MOS transistor Tr9 and Tr10. A gate and a drain of the MOS transistor Tr10 are connected to the first node N1 and the second node N2, respectively. A source of the MOS transistor T10 is connected to the power supply VDD through the MOS transistor Tr9. The MOS transistor Tr9 is always turned ON. The current supply ability of the second current supply circuit 32 is fixed. It should be noted that the above-mentioned MOS transistor Tr1 and Tr9 are provided in order to balance the number of transistors between columns.

Here, let us suppose that a current supply ability of the MOS transistor Tr10 in the second current supply circuit 32 is "100". Also, let us suppose that a current supply ability of the MOS transistor Tr2 connected to the MOS transistor Tr1 in the first current supply circuit 31 is "80" and a current supply ability of each of the others (Tr4, Tr6, Tr8) is smaller than "80". For example, the current supply ability of each of the other MOS transistors is "2". Although only three MOS transistors Tr4, Tr6 and Tr8 are represented in FIG. 8, similar MOS transistors are provided in practice. When 20 MOS transistors with the current supply ability of "2" are provided, it is possible to change the current supply ability of the first current supply circuit 31 between "80" and "120". It is therefore possible to find a combination of the offset switching signals with which the current supply abilities are balanced between the first current supply circuit 31 and the second current supply circuit 32. Through the trimming by using the offset switching signals, it is possible to set the first current and the second current equal and hence to minimize the offset value of the comparator 110. Thus, the sensitivity of the comparator 110 is improved.

Figure 9:
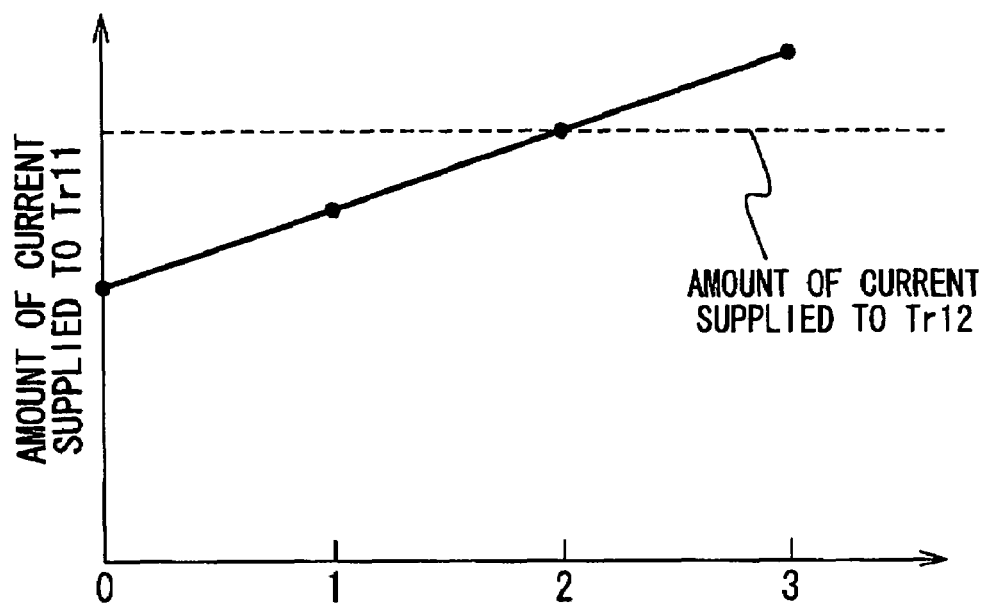
FIG. 9 is a graph showing the amounts of currents flowing through two MOS transistors Tr11 and Tr12.

Next, an example of trimming method will be described with reference to FIG. 9. As shown in FIG. 9, when only the one switch (the MOS transistor Tr1) is turned ON, the current supply ability of the first current supply circuit 31 (the amount of the first current supplied to the first MOS transistor Tr11) is lower than the current supply ability of the second current supply circuit 32 (the amount of the second current supplied to the second MOS transistor Tr12). In this case, the output OUT of the comparator 110 is "Low". On the other hand, when all the switches are turned ON, the current supply ability of the first current supply circuit 31 (the amount of the first current supplied to the first MOS transistor Tr11) is designed to be higher than the current supply ability of the second current supply circuit 32 (the amount of the second current supplied to the second MOS transistor Tr12). In this case, the output OUT of the comparator 110 is "High".

In the trimming, the plurality of switches (the MOS transistors Tr3, Tr5, Tr7) are turned ON in order according to the offset switching signals transmitted from the microcomputer. For example, the switches are turned ON one by one from the Tr3 side to the Tr7 side. As a result, the current paths to the first MOS transistor Tr11 increases step by step and hence the first current supplied to the first MOS transistor Tr11 increases step by step. The current supply ability of the first current supply circuit 31 increases monotonically. At some point, the amount of the first current exceeds the amount of the second current, and the output of the comparator 110 is inverted from "Low" to "High". At that moment, the first current and the second current are nearly balanced (ideally, the first current and the second current are equal to each other). The offset value at that moment can be adopted as the minimum offset value of the comparator 110. As described above, the trimming can be achieved by monitoring the output OUT of the comparator 110. By searching an optimal input current path, the difference between the first current and the second current due to the manufacturing errors of the MOS transistors Tr11 and Tr12 can be suppressed. By suppressing the difference, it is possible to suppress the offset values of the comparators 110a to 110d and to improve the sensitivities of the LF receiving circuit 191a to 191d.

Figure 10:
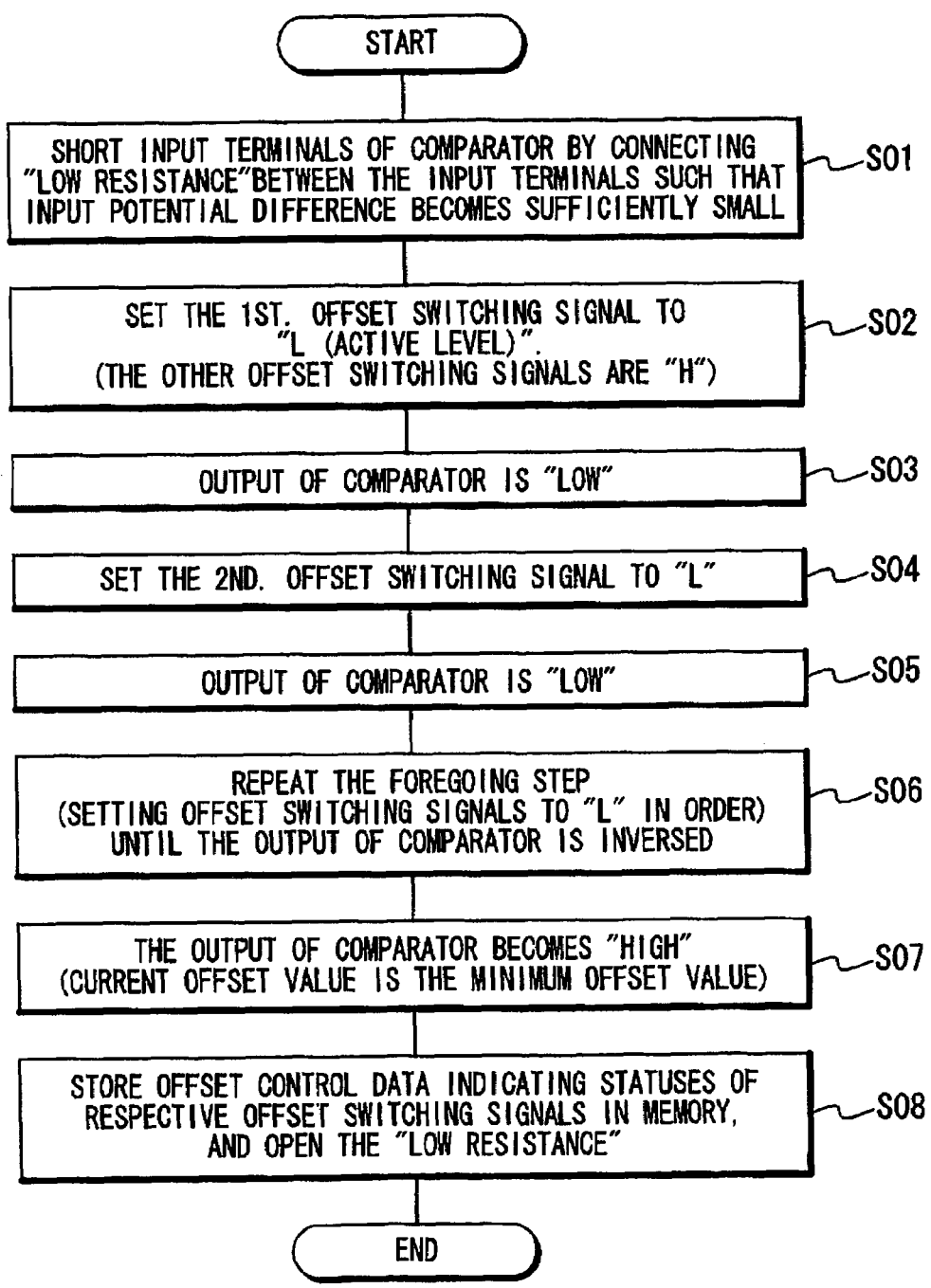
FIG. 10 is a flow chart showing a method of minimizing the offset value of the comparator having the offset control circuit according to the embodiment of the present invention.

FIG. 10 is a flow chart showing a method of trimming the sensitivity of the comparators 110a to 110d including the offset control circuits 115a to 115d.

First, the CPU 197 of the microcomputer 195 is activated. Prior to the trimming of the offset of the comparator 110, the low resistance R1 is connected between the input terminals of the comparator 110 such that the gates of the first and the second MOS transistors Tr11 and Tr12 are shorted. As a result, a difference in the input potential between the input terminals becomes sufficiently small (Step S01). Next, the first offset switching signal is set to "L (active level)", and the MOS transistor Tr3 is turned ON (Step S02). Here, the other offset switching signals are still in "H" levels. Let us suppose that the output OUT of the comparator 110 is "Low" at that moment (Step S03). Next, the second offset switching signal is set to "L (active level)", and the MOS transistor Tr5 is turned ON (Step S04). Let us suppose that the output OUT of the comparator 110 is "Low" at that moment (Step S05). Similarly, the offset switching signals are set to "L (active level)" in order until the output OUT of the comparator 110 is inversed from "Low" to "High" (Step S06). At some point, the output OUT of the comparator 110 becomes "High" (Step S07). The offset takes the minimum value with the current offset switching signals. The current offset switching signals are stored as an "offset control data" in the memory 198. Lastly, the switch SW1 is opened and the low resistance R1 is disconnected. The damping resistance at the time of actual operation is connected between the input terminals of the comparator 110 (Step S08).

As described above, the comparator 110 (the differential amplifier circuit) according to the present embodiment is constituted by the MOS transistors. Therefore, the cost of manufacturing is reduced. Moreover, it is not necessary to make the MOS transistor larger for the purpose of reducing the offset of the comparator 110, which also contributes to the reduction of the cost.

The comparator 110 according to the present embodiment is equipped with the offset control circuit 115 for adjusting the offset and trimming the sensitivity. Even though the comparator 110 is constituted by MOS transistors, it is possible to reduce the offset without increasing the cost of manufacturing. By using the microcomputer, it is possible to set the offset of the comparator 110 as small as possible and hence to improve the sensitivity. The tire-side module 15 (data communication apparatus) according to the present embodiment is equipped with the comparator 110, and its sensitivity can be controlled by the microcomputer.

Also, by using the data communication apparatus, it is possible to receive radio waves from radio sources at further distance. In the present embodiment, a stable communication can be established between the tire-side modules 15a to 15d having the offset control circuits 115a to 115d and the body-side module 22 (radio wave sources) which are located in a certain communication range. The offset control circuits 115a to 115d according to the present embodiment enable the trimming of the sensitivities of the comparators 110a to 110d and the tire-side modules 15a to 15d freely. It is possible to set the sensitivities such that the tire-side modules 15a to 15d do not respond to external noises. It is also possible to set the sensitivities such that the tire-side modules 15a to 15d respond to the radio waves from only radio sources within a specific distance.

The present embodiment has been mainly described with regard to the TPMS related to the tires of the car. It goes without saying that the present invention can be applied to other communication systems.

It is apparent that the present invention is not limited to the above embodiment, and that may be modified and changed without departing from the scope and spirit of the invention.

What is claimed is:

1. A semiconductor integrated circuit comprising:
a differential amplifier circuit including a first MOS transistor connected between a first node and a common node and a second MOS transistor connected between a second node and said common node;
a first current supply circuit configured to supply current to said first node; and
a second current supply circuit configured to supply current to said second node,
wherein a current supply ability of said first current supply circuit is variable; and
wherein said first current supply circuit includes a plurality of current mirror circuits connected to said first node, and
a number of current mirror circuits of said plurality of current minor circuits which supply current to said first node is changed in accordance with a control signal.

2. A semiconductor integrated circuit comprising:
a differential amplifier circuit including a first MOS transistor connected between a first node and a common node and a second MOS transistor connected between a second node and said common node;
a first current supply circuit configured to supply current to said first node; and
a second current supply circuit configured to supply current to said second node,
wherein a current supply ability of said first current supply circuit is variable; and
wherein said first current supply circuit includes;
a plurality of MOS transistors each of whose drain and gate are connected to said first node; and
a plurality of switches which are connected between a power supply and sources of said plurality of MOS transistors,
wherein said plurality of switches are turned ON in accordance with control signals.

3. The semiconductor integrated circuit according to claim 2,
wherein one of said plurality of switches is always turned ON.

4. The semiconductor integrated circuit according to claim 3,
wherein said plurality of switches other than said one switch are turned ON one by one in accordance with said control signals.

5. The semiconductor integrated circuit according to claim 4,
wherein when only said one switch is turned ON, a current supply ability of said first current supply circuit is lower than a current supply ability of said second current supply circuit, and
when all of said plurality of switches are turned ON, a current supply ability of said first current supply circuit is higher than a current supply ability of said second current supply circuit.

6. The semiconductor integrated circuit according to claim 3,
wherein a current supply ability of one of said plurality of MOS transistors connected to said one switch is higher than a current supply ability of any of the others of said plurality of MOS transistors.

7. The semiconductor integrated circuit according to claim 2,
wherein said second current supply circuit includes a MOS transistor whose drain, gate and source are connected to said second node, said first node and said power supply, respectively.

8. A semiconductor integrated circuit comprising:
a differential amplifier circuit including a first MOS transistor connected between a first node and a common node and a second MOS transistor connected between a second node and said common node;
a first current supply circuit configured to supply current to said first node; and
a second current supply circuit configured to supply current to said second node,
wherein a current supply ability of said first current supply circuit is variable; and
further comprising a shorting circuit configured to short a gate of said first MOS transistor and a gate of said second MOS transistor when said current supply ability of said first current supply circuit is changed,
wherein said shorting circuit includes a resistance and a switch which are series-connected between said gate of said first MOS transistor and said gate of said second MOS transistor.

9. A method of trimming sensitivity of a comparator,
said comparator having:
a differential amplifier circuit including a first MOS transistor connected between a first node and a common node and second MOS transistor connected between a second node and said common node;
a first current supply circuit configured to supply current to said first node; and
a second current supply, configured to supply current to said second node,
said method comprising:
(A) shorting a gate of said first MOS transistor and a gate of said second MOS transistor;
(B) fixing a current supply ability of said second current supply circuit; and
(C) changing a current supply ability of said first current supply circuit monotonically until an output of said comparator is inverted,
wherein said first current supply circuit includes;
a plurality of MOS transistors each of whose drain and gate are connected to said first node; and
a plurality of switches which are connected between a power supply and sources of said plurality of MOS transistors, one of said plurality of switches being always turned ON,
wherein said (C) changing includes turning ON said plurality of switches other than said one switch one by one.

10. The method according to claim 9,
wherein when only said one switch is turned ON, a current supply ability of said first current supply circuit is lower than a current supply ability of said second current supply circuit, and
when all of said plurality of switches are turned ON, a current supply ability of said first current supply circuit is higher than a current supply ability of said second current supply circuit.

* * * * *